(No Model.)  2 Sheets—Sheet 1.

E. MYRICK.
CARRIAGE TOP.

No. 262,609. Patented Aug. 15, 1882.

Attest:
Edwin A. Hildreth
E. P. W. Hildreth

Inventor:
Elijah Myrick (No Model.) 2 Sheets—Sheet 2.

E. MYRICK.
CARRIAGE TOP.

No. 262,609. Patented Aug. 15, 1882.

Attest:
Edwin A. Hildreth
E. P. W. Hildreth

Inventor:
Elijah Myrick

UNITED STATES PATENT OFFICE.

ELIJAH MYRICK, OF HARVARD, MASSACHUSETTS.

CARRIAGE-TOP.

SPECIFICATION forming part of Letters Patent No. 262,609, dated August 15, 1882.

Application filed July 12, 1880. (No model.)

*To all whom it may concern:*

Be it known that I, ELIJAH MYRICK, a citizen of the United States, residing at Harvard, in the county of Worcester and State of Massachusetts, have invented certain new and useful Improvements in Carriage-Tops; and I do hereby declare that the following is a full, clear, and exact description of the invention, which will enable others skilled in the art to which it appertains to make and use the same.

The object and nature of my invention are, first, to provide a convenient, simple, and effective device by means of which the carriage-top can be removed from the carriage and packed into a convenient form for storage; second, to provide suitable protection for the curtains of the carriage-top when rolled up; third, to provide an improved arrangement for guiding the curtains and holding them in position when they are drawn down to form the sides of the carriage-top; fourth, to provide a more convenient and durable means of buttoning the curtains to the hooks of the carriage-top frame; and, fifth, to construct a frame-work for the carriage-top especially adapted to the use of roller-curtains. I attain these objects by the devices illustrated in the accompanying drawings, in which—

Figure 1:
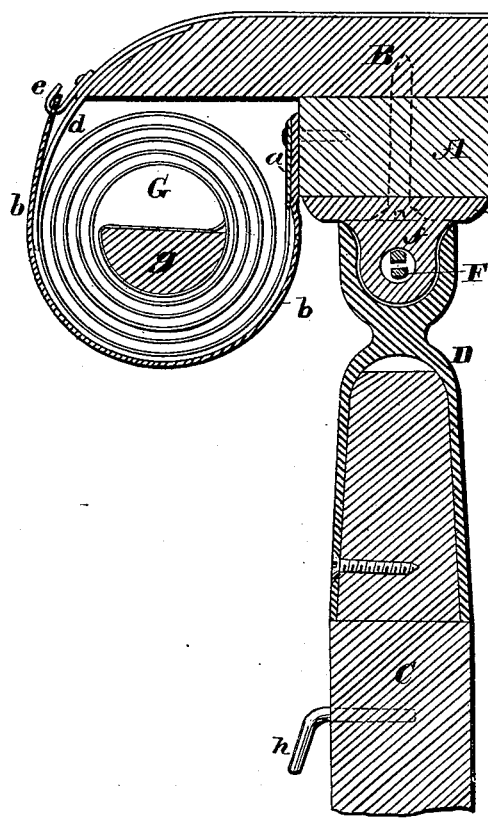
Figure 2:
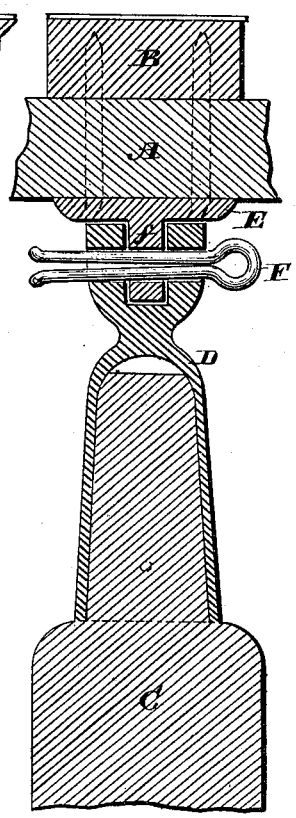
Figure 3:
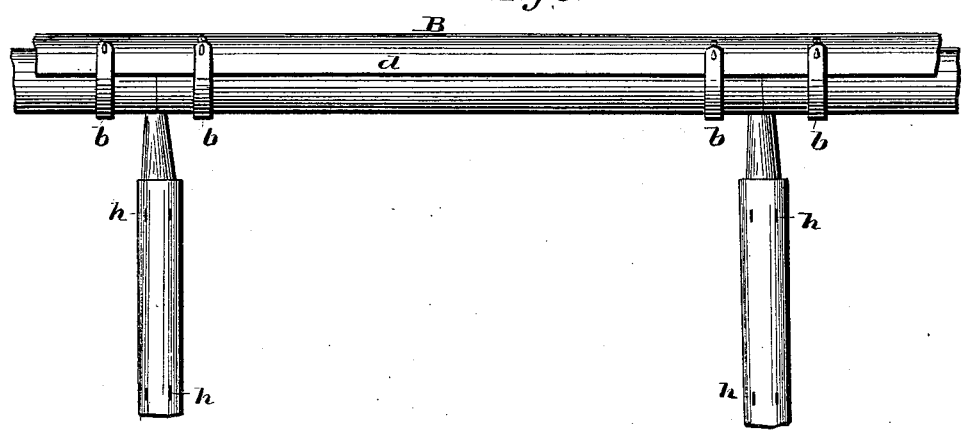
Figure 4:
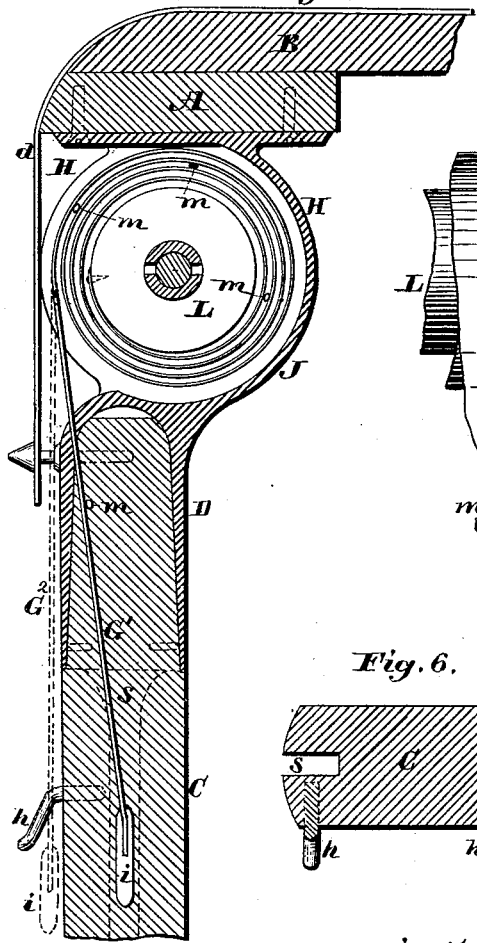
Figure 5:
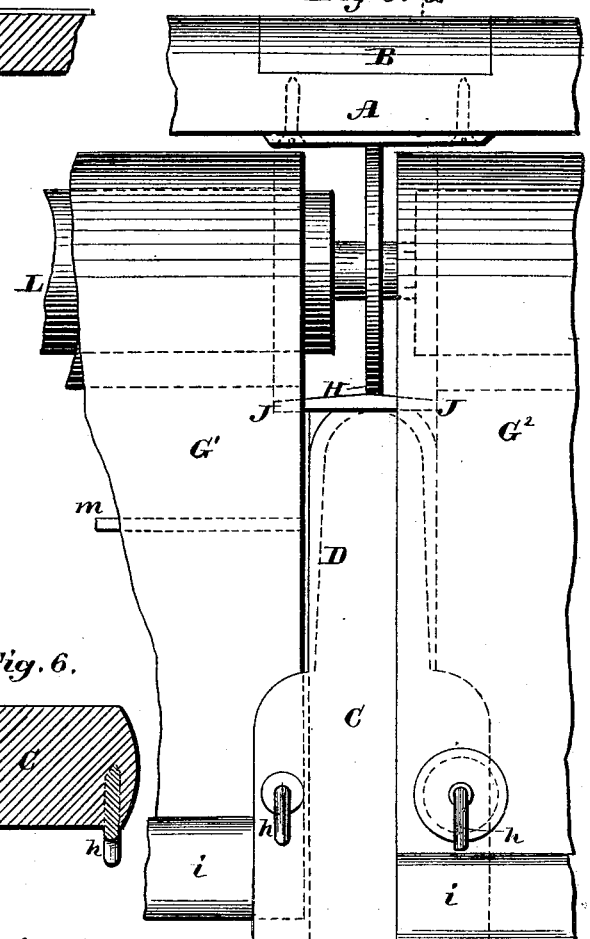
Figure 6:
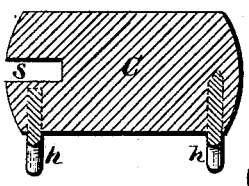
Figure 7:
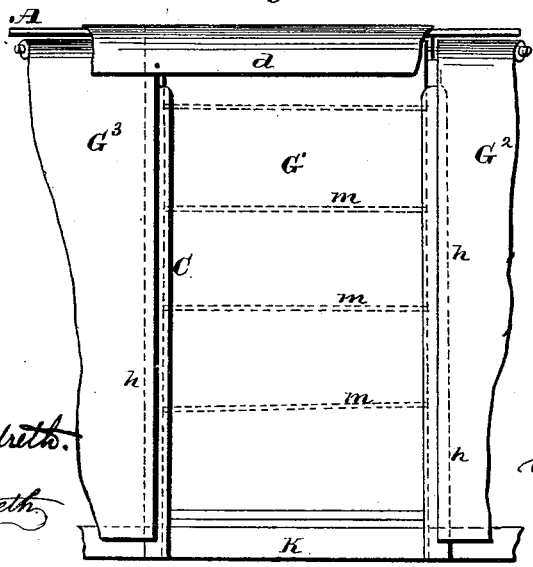

Figure 1 represents a vertical transverse section through the top portion of one of the carriage-posts, the top raves or ribs, and the roller-curtain, the parts being adapted to be removed from the carriage-body when desired. Fig. 2 represents a vertical longitudinal section through the top portion of one of the carriage-posts and the connecting portions of the frame-work, showing same parts as Fig. 1, except curtain. Fig. 3 represents a side view of two of the carriage-posts, portions of which are shown in Figs. 1 and 2, and shows the curtain rolled up and the covering-edge of the carriage-top cover. Fig. 4 represents a vertical transverse section (on the line *x y* of Fig. 5) through the upper portion of one of the carriage-top posts, showing my improved method of applying spring-roller curtains and the connections between the posts and the top frame-work. Fig. 5 represents a side view of the upper part of one of the carriage-top posts, the ends of two spring-roller curtains, a portion of the carriage-top frame, (cover being removed,) and the connecting parts. Fig. 6 represents a cross-section of one of the carriage-top posts. Fig. 7 represents a side view of one of the spring-roller curtains designed for a door, and the adjacent posts, curtains, top, &c.

Similar letters of reference indicate like parts in all the figures.

C represents one of the carriage-top posts. D, Figs. 1 and 2, represents a casting placed upon the top of each post. Each casting D is provided with a recess or mortise in its upper end, into which the tenon *f* upon the casting E fits, and is held therein by the spring-pin F. The casting E and tenon *f* are secured to the top raves, A, to which the cross-ribs B are in turn secured. The cross-ribs B support the top covering of leather or enameled cloth. The cross-ribs B are formed to project out over the posts (see Fig. 1) to form and support a covering, beneath which the curtain G can be rolled up. To form a more complete covering within which the rolled curtain is incased, I attach a strip of leather or some suitable material, *d*, extending from the edge of the cover above to or below the line of the center of the rolled curtain G. Straps *b* are secured to the frame-work and extend around the rolled curtains to hooks *e*. The raves A extend the whole length of the carriage-top, and all the cross-ribs B are secured thereto. The curtains G are rolled up upon edge roller-sticks *g*. By removing the spring-pins F the tenons *f* can be raised and the spring-pins replaced. By removing all the tenons *f* from the posts the whole top of the carriage, roller, curtains, and cover can be removed together. The posts can also be removed from the carriage or wagon body, and the whole carriage-top, when removed, occupies but a very small space, and can be easily and compactly stored.

The curtain G, Fig. 1, when down, is secured by hooks *h h* on the posts C. The curtain G is secured to an elastic hanger, *a*, at its upper edge, which elastic hanger can yield to allow the eyelet-holes in the curtain to pass over the lower ends of the hooks *h h*. By the contraction of the elastic edge *a* the curtain is raised, so that the eyelet-holes will fit up snug and close to the base of the hooks *h*. By this device the curtain is securely held upon the hooks, and the curtain and the eyelet-holes are relieved from all strain in being applied to the hooks, or, when the carriage-top is swayed or racked, the elastic edge yielding to allow for such racking of the carriage-top, instead of straining upon the eyelet-holes of the curtains.

In Figs. 4, 5, 6, and 7 I illustrate the application of spring-roller curtains and the construction of the frame-work of the carriage-top constructed according to my plan for protecting and inclosing the side curtains when rolled up. C represents one of the frame-posts. The roller-curtain G' is rolled up upon a spring-roller, L. A casting, D, fits onto the top of the post C. A flange, J, surrounds the ends of the spring-roller, while a web, H, with hollow bosses thereon, forms a support for the roller L. The web H and flange J support a flat projection on their upper side, to which the rave A is secured. The rave A extends the whole length of the carriage-top, and supports the cross-ribs B. A short curtain, d, covers and protects the roller-curtain G' when rolled up. The post C is formed with a groove, s. (See Figs. 4 and 6.) The edges of the curtain G' slide up and down in the grooves s in the posts C. Cross-stays m m, of iron, wood, or steel, are fastened across the curtain G' to hold the edges of the curtain into the grooves s s. At the lower edge of the curtain G', I attach a thin edge-piece, i, which also slides in the grooves s s, and which guides and supports in its proper position the lower edge of the sliding curtain.

The curtain G' is designed to be used as a door upon the side of the carriage, and slides up and down in the grooves s s, as heretofore described. Whenever the curtain G' is raised it is wound up upon the spring-roller L, which is constructed in the ordinary manner of spring curtain-rollers.

The curtain G² forms the sides of the carriage at either side of the door. The curtains G² are also placed on spring-rollers in the same manner as the curtain G'; but the curtains G² are not designed to slide in a groove, but fasten on the outside of the posts C. The curtain G', used for a door, can be rolled up, and the lower edge strip or counter-weight, i, raised out of the grooves s s and the curtain G' be brought down on the outside of the posts C and fastened on the hooks h, if desired.

The curtains G², which form all the sides and back of the carriage-top, excepting the doors G', are always fastened, when down, by means of the curved hooks h, as shown in Figs. 4 and 5.

The spring-roller holds the curtain up onto the hooks h. They can only be released by pulling the curtains down sufficiently to release the eyelets from the hooks h. With the hooks h curved downward, it is necessary to suspend the curtains either from a spring-roller, L, or from an elastic hanger, a.

The posts C C, as shown in Fig. 7, are designed to be applied to the outside of the carriage or wagon body k, so that the seats of the carriage can be moved back and forward without being interfered with by the posts of the carriage-top.

Having thus described my improvements, what I claim as new, and desire to secure by Letters Patent, is—

1. The combination of the post-cap D, formed with a recess above to receive the tenon f, the tenon f, secured to the top rave, A, and the pin F, all arranged to allow the removal of the raves A and top B from the posts C, substantially as described.

2. The casting D, attached to the post C, said casting being formed with a web, H, and flange J to support the ends of the curtain-rollers, and connecting the posts C to the frame-work of the carriage-top, substantially as and for the purpose described.

ELIJAH MYRICK.

Witnesses:
EDWIN A. HILDRETH,
STANLEY B. HILDRETH.